UNITED STATES PATENT OFFICE.

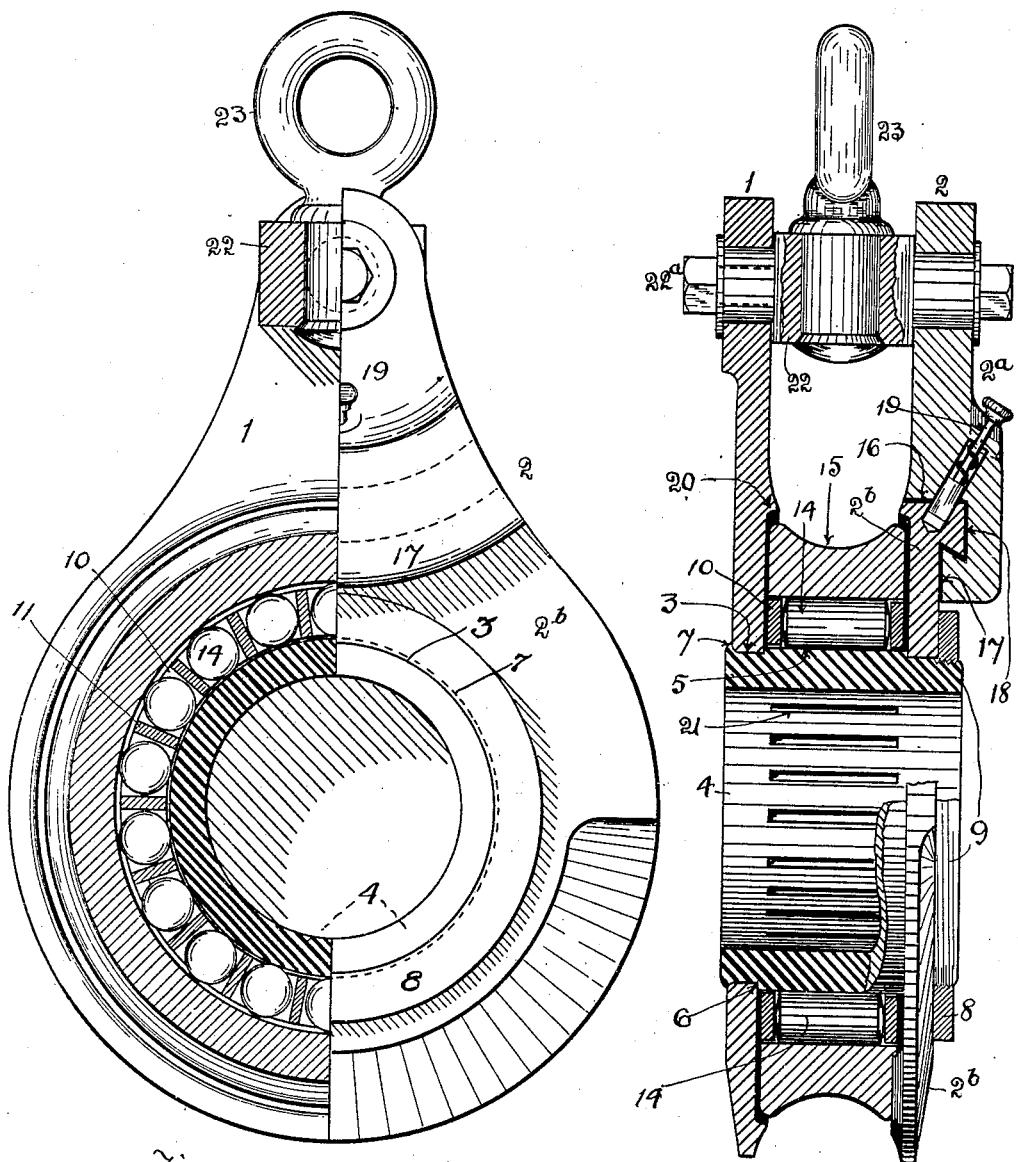

ALVIN PORTER, OF PALMER, AND LEWIS ANDERSON, OF PORTLAND, OREGON.

PULLEY-BLOCK.

No. 832,026.            Specification of Letters Patent.            Patented Sept. 25, 1906.

Application filed March 24, 1906. Serial No. 307,937.

*To all whom it may concern:*

Be it known that we, ALVIN PORTER, of Palmer, and LEWIS ANDERSON, of Portland, Multnomah county, Oregon, have invented a new and useful Improvement in Pulley-Blocks, of which the following is a specification, reference being had to the accompanying drawings as constituting a part thereof.

This invention has for its object to obtain a pulley-block the parts of which are so arranged as to give strength and durability and at the same time avoid unnecessary weight of material.

It is further our object to so arrange the parts that the cable can be readily slipped off and on the sheave of the pulley.

It is further our object to so arrange the parts that one side or cheek of the block may be opened for the insertion and removal of the cable, but to avoid loose parts, which are apt to be lost in service.

Furthermore, instead of having a central pin for the sheaves to rotate on, which pin is usually of small diameter and allows the cable when displaced to exert a considerable lateral strain on the side, we provide a central tubular bearing of much larger diameter relatively than would be such bearing-pin, and we use in connection therewith a sheave of relatively smaller depth of body—that is, considering the same on the plane extending radially from its eyes or inner bearing-face to its exterior or groove face, by which arrangement the lateral strain which would be exerted by the cable when displaced is minimized, as will appear.

Furthermore, by reason of our pulley being made with a hollow core the material and weight so economized may be effectively added to strengthen the sides of the pulley without adding to the weight of the pulley-block as a whole.

The same structural feature also enables us to cast the sides of our pulley instead of having to forge them.

Our invention also embodies other structural features and combinations hereinafter fully described.

In the drawings, Figure 1 is a side elevation, the left half being shown in section. Fig. 2 is a cross-section showing also a partial end view of the lower part of one side of the shell and a portion of the lower part of the inner bearing, and Fig. 3 is a detail of construction to be more fully described in the body of the specification.

The numerals designate the parts described.

Our pulley comprises two shell sides 1 2, made with large eyes 3, respectively, in which to receive a tubular bearing 4. The latter is made with a protruding medial part 5 and on both ends thereof shoulders 6. The side 1 is affixed in place on the bearing 4 by setting the same against the shoulder 6 and then tapping down the edge 7 of the bearing, the outer verge of the eye 3 being preferably countersunk to receive part of such tapped-down edge. The side 2 is fixed in place by means of a nut 8, screwed on the threaded portion 9 of the bearing 4, thus rendering the side 2 removable. On the protruding part 5 of the bearing 4 is placed a cage 10, of which a detail is shown in Fig. 3, the same being an integral casting of brass or iron.

As observable from Fig. 3, the cage 10 comprises sides $10^a$ $10^b$, and intermediate transverse partitions 11, arranged equidistant. We prefer to make such partitions 11 of the tapering shape shown in Figs. 3, $11^a$, so that the distance 12 12 between the opposite faces of partitions $11^a$ will equal the distance 13 13, thereby insuring greater freedom of motion to the series of roller-pins 14 inserted in the pockets of the cage and providing a roller-bearing for the sheave 15. The roller-pins are just short lengths of rods rounded at their ends. They are dropped into the pockets of the cage after the latter has been placed on the bearing 4 and may be temporarily held in place by means of a string until the sheave 15 and the side 2 have been put in place, after which the string is withdrawn. The construction of the sheave 15 is best seen from Fig. 2.

The shell side 2 is made in two parts $2^a$ $2^b$, abutting with each other, on an arc of which the axial line of the pivoting-bar 22 is the center, and the parts are adapted to interlock with each other by providing the part $2^a$ with a recess 16 and a beveled flange 17 and the part $2^b$ with a beveled flange 18, the parts when in place forming a sort of dovetail joint with each other, as shown in Fig. 2. Thus the upper part $2^a$ is adapted to be moved to one side on its pivoted bearing, the pivoting-bar 22, so as to leave an opening for the insertion and removal of the cable.

To lock the two parts 2ᵃ 2ᵇ of the side 2 in position when such side is closed, we provide a spring-controlled keeper or bolt 19, seated in a cavity therefor provided in the part 2ᵃ and projected into a cavity therefor made in the part 2ᵇ.

The inner bearing-face of the side 1 and of the lower section 2ᵇ of the side 2 are made with protuberances 20, respectively arranged to overlap the rim of the sheave and prevent grit from getting in behind the sides thereof, and the bearing 4 is made with a series of slots 21, through which to discharge such particles of grit as may get in between the bearing notwithstanding.

The upper ends of the sides 1 2 are united by a pivoting cross-bar 22, secured in place by a bolt and nut 22ᵃ, and on the pivoting-bar 22 is secured a swiveling-eye 23, the construction of these parts being like a universal joint.

It will be noted from the construction above described that the inner bearing-face of the sheave bears upon a much larger surface than is obtainable by the use of the old-style bearing-pin, and because of this construction our sheave will last much longer in service, the construction in this respect of our pulley being designed to prevent the sheave from becoming heated and to so arrange the parts that a small amount of lubricant will be sufficient to keep our pulley-block in good working condition, and it will further be noted from the described arrangement that it brings any lateral strain of the cable against one or the other of the sides of the shell so close to the central bearing of the sheave as to reduce such strain to an unimportant degree.

We claim—

1. A pulley-block comprising two shell sides, one thereof being made with an opening portion, a tubular bearing on which the sides are affixed, a cage mounted on such bearing, roller-pins in the pockets thereof and a sheave revoluble on such roller-bearing.

2. In a pulley-block the combination of two shell sides, a pivoted bearing, a sheave revoluble thereon, and a pivot member uniting the upper ends of the shell sides, one of the latter comprising two sections 2ᵃ 2ᵇ, abutting with each other on an arc of which the axial line of said pivot member is the center, and such parts being adapted to form with each other when in their interlocking position, a dovetail-like joint, and means for locking the movable part of said side section in place, when closed.

3. In a pulley-block the combination comprising two shell sides a tubular sheave-bearing rigidly affixed in one shell side, and the opposite shell side being removably affixed on the other end of the tubular bearing.

4. In a pulley-block the combination comprising two shell sides, a tubular sheave-bearing rigidly affixed in one shell side, and the opposite shell side being removably affixed on the other end of the tubular bearing, a cage mounted on the bearing, roller-pins in the pockets thereof, and a sheave revoluble on the roller-pins.

5. In a pulley-block the combination comprising two shell sides, a tubular sheave-bearing rigidly affixed in one shell side, and the opposite shell side being removably affixed on the other end of the tubular bearing, a cage mounted on the bearing, roller-pins in the pockets thereof, and a sheave revoluble on the roller-pins, said tubular bearing being made with slots as 21 to discharge such grit as may work past the sheave.

ALVIN PORTER.
LEWIS ANDERSON.

Witnesses:
T. J. GEISLER,
CECIL LONG.